UNITED STATES PATENT OFFICE.

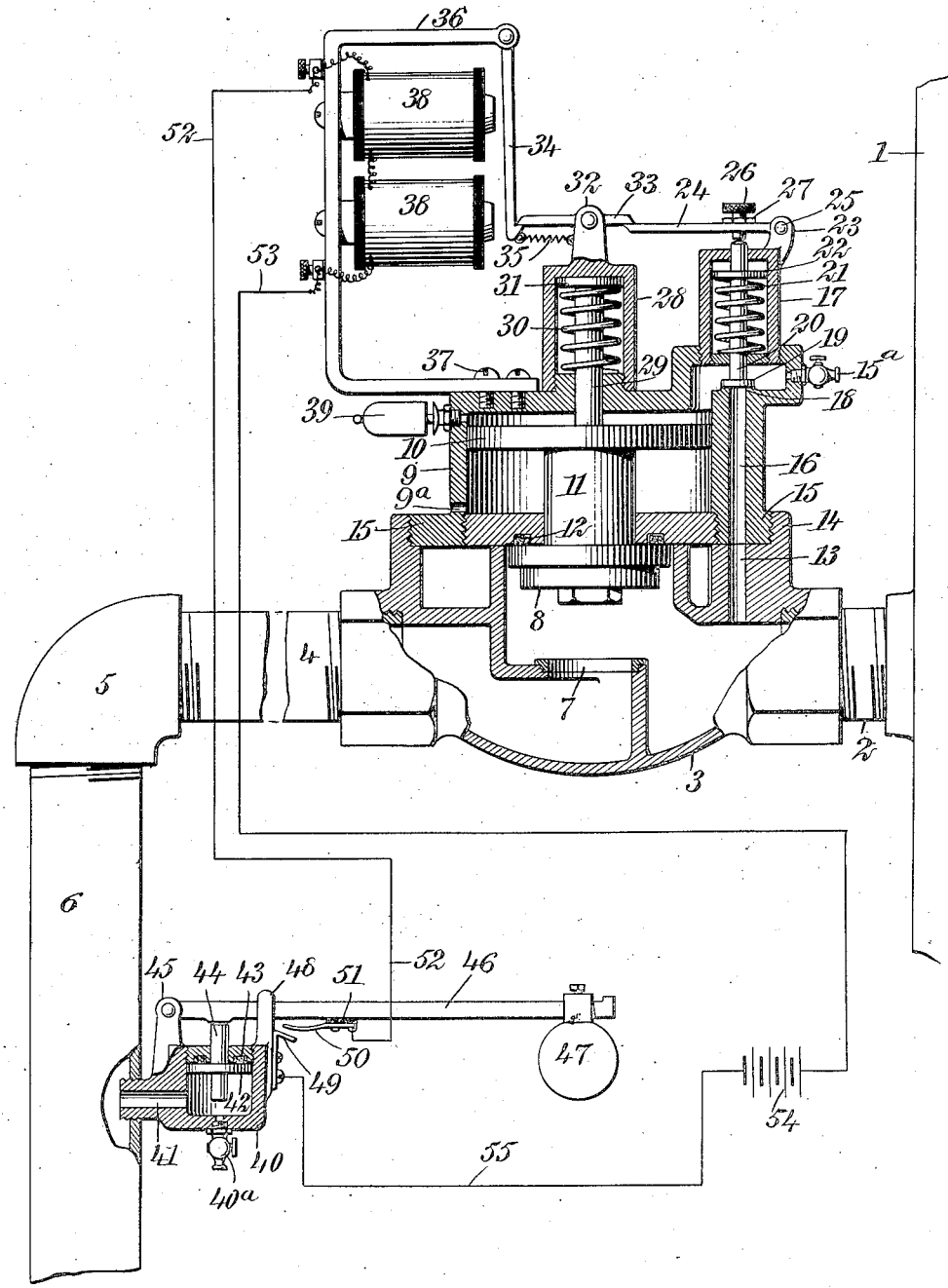

EDMUND LOMAX CRIDGE, OF PASSAIC, NEW JERSEY.

AUTOMATIC SHUT-OFF FOR FLUIDS.

No. 844,923.　　　　Specification of Letters Patent.　　　　Patented Feb. 19, 1907.

Application filed February 16, 1906. Serial No. 301,370.

*To all whom it may concern:*

Be it known that I, EDMUND LOMAX CRIDGE, a citizen of the United States, and a resident of Passaic, in the county of Passaic and State of New Jersey, have invented a new and Improved Automatic Shut-Off for Fluids, of which the following is a full, clear, and exact description.

My invention relates to valve mechanism, my more particular object being to provide a valve operated and controlled by means of pressure of a fluid passing through said valve, the arrangement being such that when the pressure of the fluid falls below a predetermined limit the valve closes and shuts off further flow of the fluid.

Reference is to be had to the accompanying drawing, forming a part of this specification, in which the figure represents a diagrammatic elevation of my invention, certain parts being broken away for the sake of clearness.

It will be understood that I do not limit myself to the use of an expansible medium, such as steam or compressed air, for the reason that my invention may be employed in connection with liquids and all other forms of fluid bodies.

A boiler is shown at 1 and is connected by a comparatively short pipe 2 with a valve-casing 3. From this valve-casing a pipe 4 leads to an elbow 5, the latter being connected to a pipe 6.

The valve-casing 3 is provided with a valve-seat 7, and a valve member 8 is adapted to engage and disengage this seat.

Connected with the valve-casing 3 is a cylinder 9, provided with a vent $9^a$. Fitted steam-tight within this cylinder is a piston 10, which is connected with the valve member 8 by means of a piston-rod 11, preferably of large diameter, as shown. A packing 12 is engaged by the valve member 8 when the latter is in its uppermost position.

The valve-casing 3 is provided with a passage 13 and with an annular flange 14, threaded internally. The base 15 of the cylinder 9 is threaded externally and is screwed into the threaded flange 14. The passage 16 in the wall of the cylinder 9 registers with the passage 13. At 17 is a spring-casing superposed over the cylinder 9. The passage 16 is bounded at its upper end by a valve-seat 18, the latter being engaged by a small valve 19, mounted upon a stem 20. This stem is encircled by a spiral spring 21, mounted within the spring-casing 17. Mounted upon the stem 20 is a fixed disk 22, against which the spring 21 exerts its tension. A bracket 23 extends upward from the spring-casing 17. Connected with the bracket 23 by means of a pivot 25 is a lever 24. A set-screw 26 passes through the lever 24 and engages the upper end of the valve-stem 20. A locking-nut 27 encircles the screw 26 and engages the lever 24 for the purpose of adjusting the lever 24 relatively to the stem 20.

Mounted centrally over the cylinder 9 is a spring-casing 28. A stem 29, connected rigidly with the piston 10, extends into the casing 28 and is encircled by a spiral spring 30. The upper end of the stem 29 is provided with a disk 31, which receives the tension of the spring. The spring 30, being at its maximum length, maintains the piston 10, the piston-rod 11, and the valve member 8 in their respective normal positions, as indicated in the figure. A bracket 32 is mounted upon the upper end of the casing 28. Pivoted within this bracket 32 is a lever 33, which engages the lever 24 and naturally holds the same in a general position approximately horizontal. A hook 34, of iron or steel, is connected by a spring 35 with the bracket 32. The lower end of this hook 34 normally engages one end of the lever 33.

A bracket 36 is mounted upon the cylinder 9 by means of screws 37, and on said bracket the hook 34 is pendent. Electromagnets 38 are connected with the bracket 36 and supported thereby. A whistle 39 communicates with the upper end of the cylinder 9 and produces an alarm whenever steam (or other expansible medium) is admitted into the upper end of the cylinder. The pipe 6 in the apparatus shown is a steam-pipe. Connected with this pipe 6 by means of a tubular passage 41 is a valve-casing 40. Mounted within this valve-casing is a piston 42. A hand-valve $40^a$ is used for venting the casing 40 at will. The piston 42 normally engages a packing 43. Connected with the piston 42 is a stem 44, projecting upwardly from the casing 40. Pivoted upon a bracket 45 is an arm 46, carrying a weight 47, which may be adjusted, said arm resting upon the stem 44. A guide 48 encircles the arm 46 and limits its upward movement. A contact member 50 is mounted upon the lower side of the arm 46 and insulated therefrom by means of hard rubber 51 or other insulating medium. From the contact member 50 a wire 52 leads to the magnets 38, and thence a wire 53 leads to a battery 54. This battery is connected by a wire 55 with the contact member 49. The hand-valve 15ª is used for allowing the escape of steam from above the piston 10 in resetting the valve. It may also be employed for removing any water of condensation which may form above the piston.

The operation of my device is as follows: The steam or other fluid body normally passes through the pipe 2, the valve 3, the pipe 4, the elbow 5, and the pipe 6 and exerts a pressure through the passage 41 against the under side of the piston 42. This raises the piston 42 to its normal position (indicated in the figure) and in so doing causes the stem 44 to raise the weighted arm 46. The contact members 49 and 50 are now out of engagement, and consequently the magnets 38 are deënergized. The hook 34, being of iron or other magnetic substance, is adapted to serve as an armature for the magnets 38. The valve member 8 is by action of the spring 31 maintained in its normal position, so as to prevent the passage of the fluid. The small valve 19, being pressed by the action of the spring 21 upon the seat 18, closes the upper end of the passage 16. If now, owing to relaxation of pressure of the fluid medium passing through the pipe 6, the piston 42 is allowed to descend by the action of the weight 47, the contact member 50 is brought into engagement with the contact member 49, thereby completing the following circuit: battery 54, wire 55, contact members 49 50, wire 52, magnet 38, wire 53, back to battery 54. This energizes the magnets 38 and causes the armature 34 to be attracted, thereby disengaging the lever 33, and consequently releasing the lever 24. The upper end of the stem 20 being no longer held down, the tension of the spring 21 raises this stem and lifts the valve 19 off the seat 18. This permits the fluid to pass upwardly through the passages 13 and 16 into the upper end of the cylinder 9, where it exerts a downward pressure upon the piston 10 and forces the valve 8 into engagement with the seat 7, thereby stopping the general flow of the medium there before flowing through the pipe 2, the valve 3, and the pipes 4 and 6.

While in the particular apparatus shown the pressure controlling the piston 42 is greater than the atmospheric pressure, I do not limit myself to this degree of pressure.

Having thus described my invention, I claim as new and desire to secure by Letters Patent—

1. The combination of a valve provided with a closure member, pressure-controlled mechanism for actuating said closure member, an electromagnet for operating said pressure-controlled mechanism, an electric circuit for energizing said electromagnet, contact mechanism for opening and closing said electric circuit, and means controllable by the pressure of the medium flowing through said valve for opening and closing said contact mechanism.

2. The combination of a casing, a piston mounted therein, a weighted arm connected with said piston, a contact to be opened and closed by movements of said weighted arm, an electric circuit connected with said contact, a magnet connected with said electric circuit and energized thereby, a valve for controlling the flow of a medium, and mechanism operated by said electromagnet for actuating said valve.

3. The combination of a valve provided with a closure member, a cylinder associated with said valve and provided with a piston for actuating said closure member, means for admitting a small portion of the fluid passing through said valve to said piston, a smaller valve for temporarily obstructing the flow of said fluid into said cylinder, and mechanism controllable electrically from a distance for displacing said smaller valve.

4. The combination of a valve provided with a closure member, pressure-controlled mechanism for actuating said closure member, electric mechanism for actuating said pressure-controlled mechanism, and means controllable automatically by the pressure of a medium flowing through said valve for energizing and deënergizing said electric mechanism.

5. The combination of a valve provided with a closure member, means for actuating said closure member positively, electric mechanism for controlling said means, said electric mechanism being provided with a circuit, and contact mechanism controllable by pressure of a medium flowing through said valve for varying the condition of said electric circuit.

6. The combination of a valve provided with a closure member, mechanism for actuating said closure member, an electric circuit for controlling said mechanism, and means controllable automatically by pressure of a fluid medium passing through said valve for opening and closing said electric circuit.

In testimony whereof I have signed my name to this specification in the presence of two subscribing witnesses.

EDMUND LOMAX CRIDGE.

Witnesses:
   A. WARD VAN RIPER,
   CHARLES R. GARROBRANT.